United States Patent
Ishida et al.

(10) Patent No.: US 10,957,070 B2
(45) Date of Patent: Mar. 23, 2021

(54) INFORMATION PROCESSING APPARATUS, INFORMATION PROCESSING SYSTEM, OPERATION OBJECT, AND INFORMATION PROCESSING METHOD

(71) Applicant: Sony Interactive Entertainment Inc., Tokyo (JP)

(72) Inventors: Takayuki Ishida, Tokyo (JP); Akio Ohba, Kanagawa (JP); Tetsugo Inada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 90 days.

(21) Appl. No.: 16/317,685

(22) PCT Filed: Aug. 15, 2017

(86) PCT No.: PCT/JP2017/029404
§ 371 (c)(1),
(2) Date: Jan. 14, 2019

(87) PCT Pub. No.: WO2018/037975
PCT Pub. Date: Mar. 1, 2018

(65) Prior Publication Data
US 2019/0295286 A1 Sep. 26, 2019

(30) Foreign Application Priority Data
Aug. 22, 2016 (JP) .............................. JP2016-162288

(51) Int. Cl.
*G06T 7/73* (2017.01)
*A63F 13/23* (2014.01)
(Continued)

(52) U.S. Cl.
CPC ................. *G06T 7/73* (2017.01); *A63F 13/23* (2014.09); *G06T 7/536* (2017.01); *G06T 7/70* (2017.01); *A63F 2300/1025* (2013.01)

(58) Field of Classification Search
CPC .. A63F 13/23; A63F 2300/1025; G06T 7/536; G06T 7/70; G06T 7/73; G06T 2207/30204
See application file for complete search history.

(56) References Cited

U.S. PATENT DOCUMENTS 5,222,202 A * 6/1993 Koyamada .............. G06T 17/20
345/423
6,353,439 B1 * 3/2002 Lindholm ............... G06T 11/40
345/426
(Continued)

FOREIGN PATENT DOCUMENTS

JP 2004145664 A 5/2004
JP 2005296478 A 10/2005
(Continued)

OTHER PUBLICATIONS

International Search Report for corresponding PCT Application PCT/JP2017/029404, 2 pages, dated Nov. 7, 2017.
(Continued)

*Primary Examiner* — Mekonen T Bekele
(74) *Attorney, Agent, or Firm* — Matthew B. Dernier, Esq.

(57) ABSTRACT

An operation object includes a polyhedron. The polyhedron includes characteristic surfaces formed by cutting each vertex of a cube at different angles. An information processing apparatus acquires a normal vector of each surface from a polarized image thereof. Further, the information processing apparatus identifies the characteristic surface by defining, as a characteristic amount, an angle formed by an average vector $N_a$ of normal vectors $N_1$, $N_2$, and $N_3$ of
(Continued)

reference surfaces that orthogonally intersect each other and a normal vector $N_0$ of the characteristic surface surrounded by the reference surfaces. The specification result and the normal vectors thereof are used to acquire the position and orientation of the operation object.

16 Claims, 9 Drawing Sheets

(51) Int. Cl.
*G06T 7/536* (2017.01)
*G06T 7/70* (2017.01)

(56) References Cited

U.S. PATENT DOCUMENTS

| | | | |
|---|---|---|---|
| 7,200,262 B2* | 4/2007 | Sawada | G06T 7/514 345/426 |
| 7,787,696 B2* | 8/2010 | Wilhelm | G01B 11/24 345/421 |
| 2003/0222875 A1* | 12/2003 | Kawakami | G06T 15/02 345/473 |
| 2007/0098219 A1 | 5/2007 | Spence | |
| 2007/0200938 A1* | 8/2007 | Kaku | H04N 9/74 348/239 |
| 2007/0222781 A1* | 9/2007 | Kondo | G06T 15/506 345/426 |
| 2008/0231631 A1* | 9/2008 | Matsumura | G06T 15/60 345/419 |
| 2009/0135183 A1* | 5/2009 | Sato | H04N 5/232 345/426 |
| 2009/0141027 A1* | 6/2009 | Sato | H04N 5/232 345/426 |
| 2015/0123966 A1* | 5/2015 | Newman | G06T 19/006 345/419 |
| 2015/0243080 A1* | 8/2015 | Steinbach | G06K 9/00664 345/633 |
| 2015/0279097 A1* | 10/2015 | Noma | G06T 11/206 345/420 |
| 2019/0213739 A1* | 7/2019 | Ohba | G06K 9/4604 |
| 2019/0230281 A1* | 7/2019 | Ohba | H04N 7/04 |
| 2020/0050833 A1* | 2/2020 | Ogasawara | G06T 7/00 |
| 2020/0175715 A1* | 6/2020 | Ogasawara | G06T 7/73 |

FOREIGN PATENT DOCUMENTS

| | | |
|---|---|---|
| WO | 2007050885 A2 | 5/2007 |
| WO | WO-2014181587 A1 * | 11/2014 ............ H04Q 9/00 |

OTHER PUBLICATIONS

International Preliminary Report on Patentability and Written Opinion for corresponding PCT Application PCT/JP2017/029404, 12 pages, dated Feb. 26, 2019.
Extended European Search Report for corresponding EP Application EP17843458, 8 pages, dated Jan. 13, 2020.
Kazutada Kishikawa, et al., "A model-based recognition of glossy objects using their polarimetrical properties" Advanced Robotics, vol. 2, No. 2, pp. 137-147, Jan. 1, 1987.
Communication Pursuant to Article 94(3) EOC for corresponding EP Application EP17843458.5, 5 pages, dated Oct. 21, 2020.
Wikipedia, "Regular Polyhedron" https://en.wikipedia.org/w/index.php?title=Regular_polyhedron&oldid=734630339, 9 pages, Aug. 15, 2016.

* cited by examiner

| SURFACE ID | CHARACTERISTIC ANGLE |
|---|---|
| $C_1$ | $\theta_1$ |
| $C_2$ | $\theta_2$ |
| $C_3$ | $\theta_3$ |
| ... | ... |
| $C_8$ | $\theta_8$ |

300

FIG.8
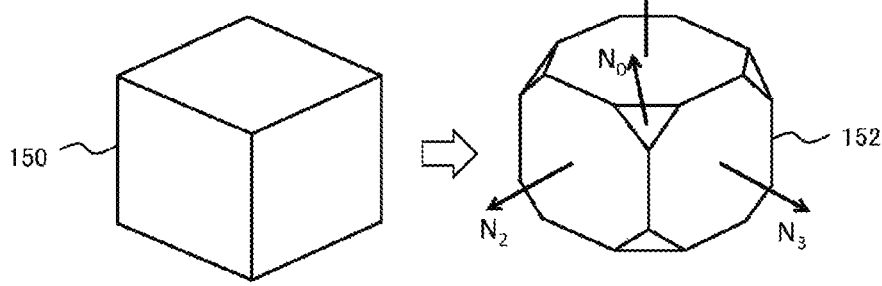
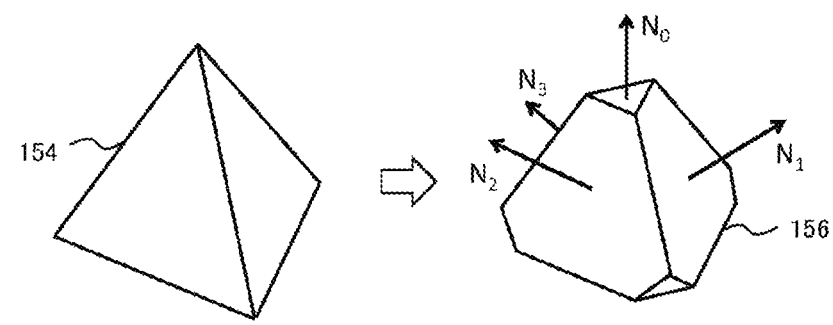
FIG.9
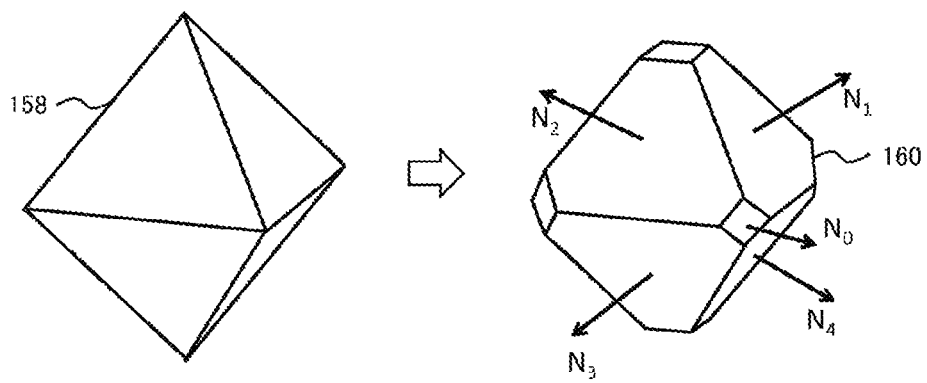
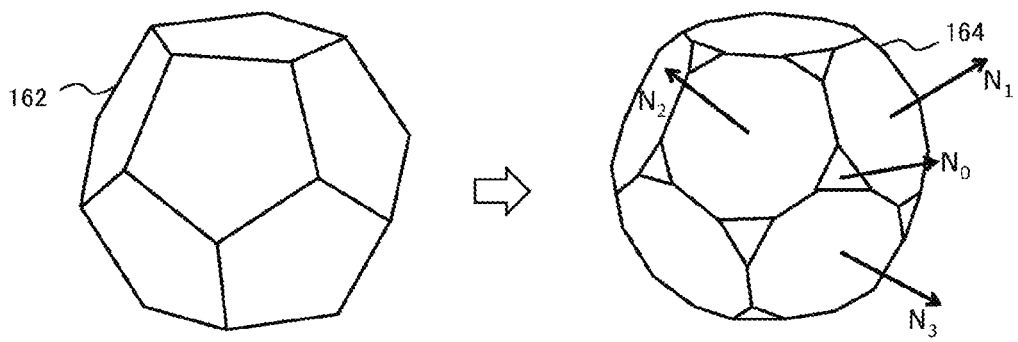

FIG.12

| SIDE ID | CHARACTERISTIC ANGLE |
|---------|----------------------|
| $E_1$   | $\theta_1$           |
| $E_2$   | $\theta_2$           |
| $E_3$   | $\theta_3$           |
| $E_4$   | $\theta_4$           |
| $E_5$   | $\theta_5$           |
| ...     | ...                  |
| $E_{24}$ | $\theta_{24}$       |

310

INFORMATION PROCESSING APPARATUS, INFORMATION PROCESSING SYSTEM, OPERATION OBJECT, AND INFORMATION PROCESSING METHOD

TECHNICAL FIELD

The present invention relates to an information processing apparatus and information processing system that perform information processing by using a photographed image, an operation object that is used therefor, and an information processing method.

BACKGROUND ART

In recent years, in a field of information processing such as an electronic game, movements of a user are taken in as input information in real time on the basis of the photographed image. Thereby, intuitive operations or image expressions with a feeling of presence have been implemented. For example, techniques have been put to practical use in which using as a controller an apparatus including a marker that emits light with a predetermined color, movements of the user are specified by using the photographed image as the input information, and the information processing according to the movements of the user is performed (e.g., see PTL 1).

CITATION LIST

Patent Literature

[PTL 1] WO 2007/050885A2

SUMMARY

Technical Problems

A marker having a predetermined shape, size, and color is used and thereby detection of an image and acquisition of a position in the photographed image are easily performed and a state or movement in a real world is efficiently taken in the information processing. However, in order to exert such a role with high accuracy, it is important to photograph the entire marker. When a portion of the marker is hidden, for example, in conditions in which a plurality of persons or things are complicated, a detection accuracy is possibly deteriorated and a negative effect is caused on information processing. Further, as an easy detection is more pursued, a shape thereof is more simplified. Therefore, information that can be acquired by using the marker is easy to limit.

The present invention has been made in view of the above problem. An object of the present invention is to provide techniques in which various pieces of information can be stably acquired regardless of conditions in the information processing in which the photographed image is used as the input information.

Solution to Problems

One aspect of the present invention relates to an information processing apparatus. The information processing apparatus includes a normal line acquisition section configured to acquire a normal vector of a surface of an object from a polarized image in which the object is photographed; an object information acquisition section configured to acquire predetermined information regarding the object on the basis of a relationship between angles of normal vectors of a plurality of surfaces included in the object; and an output data generation section configured to perform processing based on the predetermined information regarding the object and output a result of the processing.

Another aspect of the present invention relates to an information processing system. The information processing system includes an image pickup apparatus configured to photograph a polarized image of an object; and an information processing apparatus configured to perform information processing according to a state of the object by using the polarized image, in which the information processing apparatus includes: a normal line acquisition section configured to acquire a normal vector of a surface of the object from the polarized image; an object information acquisition section configured to acquire predetermined information regarding the object on the basis of a relationship between angles of normal vectors of a plurality of surfaces included in the object; and an output data generation section configured to perform processing based on the predetermined information regarding the object and output a result of the processing.

Still another aspect of the present invention relates to an operation object. The operation object is an operation object used as input information of information processing by photographing a polarized image and includes a plurality of reference surfaces in which an angle formed by the reference surfaces is a predetermined value; and a characteristic surface that is contacted with the plurality of reference surfaces and in which angles for the plurality of reference surfaces are made different in the operation object.

Still another aspect of the present invention relates to an information processing method. The information processing method performed by an information processing apparatus, includes a step of acquiring data of a polarized image in which an object is photographed, from an image pickup apparatus; a step of acquiring a normal vector of a surface of the object from the polarized image; a step of acquiring predetermined information regarding the object on the basis of a relationship between angles of normal vectors of a plurality of surfaces included in the object; and a step of performing processing based on the predetermined information regarding the object and outputting a result of the processing to an external apparatus.

It should be noted that any combinations of the above-mentioned components and the expressions of the present invention are converted between a method, an apparatus, a computer program, and the like and they are also effective as modes of the present invention.

Advantageous Effect of Invention

According to the present invention, in information processing using the photographed image as the input information, various pieces of information can be stably acquired regardless of conditions.

BRIEF DESCRIPTION OF DRAWINGS

FIG. 8 is a diagram illustrating a polyhedron that can be used as the object according to the embodiment 1.

FIG. 9 is a diagram illustrating the polyhedron that can be used as the object according to the embodiment 1.

FIG. 12 is a diagram illustrating a structure example of the registration data of the characteristic amount, which is stored in the model data storage section at the time of giving the characteristic amount to each side according to the embodiment 1.

DESCRIPTION OF EMBODIMENTS

Embodiment 1

Figure 1:
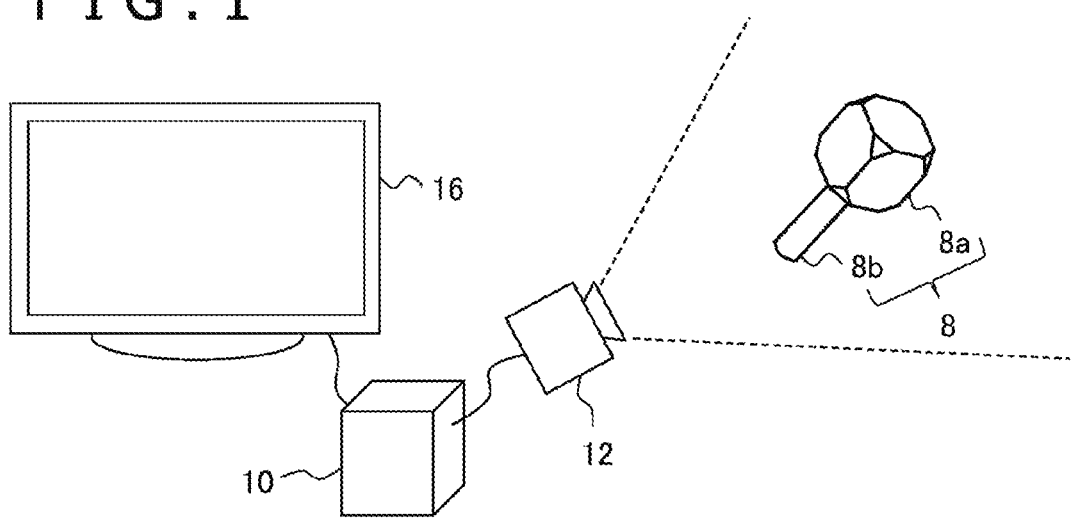
FIG. 1 is a diagram illustrating a configuration example of an information processing system according to an embodiment 1.

In the present embodiment, a cube including a polyhedron of a predetermined shape is used as an operation object (hereinafter, simply referred to as an "object") having a function of a marker. Further, an angle of a surface is acquired as a characteristic amount from a photographed image to thereby use the angle for information processing. FIG. 1 illustrates a configuration example of an information processing system according to the present embodiment. The information processing system includes an object 8, an image pickup apparatus 12 that photographs an object space including the object 8 at a predetermined frame rate, an information processing apparatus 10 that acquires data of the photographed image and performs predetermined information processing, and a display apparatus 16 that outputs a result of the information processing. In the information processing system, an input apparatus that receives an operation for the information processing apparatus 10 from a user may be further included. The information processing apparatus 10 is further connected to a network such as the Internet and thereby may be communicable with external apparatuses such as a server.

The information processing apparatus 10 may be connected to the image pickup apparatus 12 and the display apparatus 16 by using a wired cable. Alternatively, the information processing apparatus 10 may be wireless connected to the image pickup apparatus 12 and the display apparatus 16 by using a wireless LAN (Local Area Network) or the like. Further, any two or more of the information processing apparatus 10, the image pickup apparatus 12, and the display apparatus 16 may be combined to be used as an integral apparatus. For example, the information processing system may be realized by using a camera or portable terminal equipped with the above apparatuses. Alternatively, the display apparatus 16 may be used as a head-mounted display that is worn on the head by the user to display an image before the eyes. Further, the head-mounted display may be equipped with the image pickup apparatus 12 so as to photograph an image corresponding to a line of sight of the user. In either case, appearance shapes of the information processing apparatus 10, the image pickup apparatus 12, and the display apparatus 16 are not limited to the illustrated appearance shapes.

The object 8 is a cube that is formed with synthetic resin etc. and includes a polyhedron 8a composed of a plurality of flat surfaces in which formed angles are given. An internal portion of the object 8 may be a void or filled with the synthetic resin etc. Alternatively, the object 8 may house at least any one of a light-emission mechanism such as light-emitting diodes and various sensors that measure an orientation and a position, such as an acceleration sensor. The illustrated object 8 has a configuration in which a handle 8b that is assumed to be grasped by the user is connected to the polyhedron 8a. Note, however, that a configuration of the object 8 is not limited thereto; further, the object 8 may be directly handled like a building block as the polyhedron 8a alone or the object 8 may have a configuration in which the polyhedron 8a is attached to a separately prepared input apparatus.

The image pickup apparatus 12 photographs a polarized image of a real space including the object 8 at a predetermined rate. The information processing apparatus 10 acquires a normal vector of a surface photographed as an image by using the polarized image from among surfaces constituting the polyhedron. Then, the information processing apparatus 10 acquires relative angles thereof as the characteristic amount to identify the surfaces and identifies the object 8 itself or specifies the position and orientation on the basis of the results. The information processing apparatus 10 performs the information processing so as to correspond to the specified result and generates a display image or data of sounds to be output to the display apparatus 16.

A content of the information processing to be performed corresponding to information according to the object 8 is not particularly limited. For example, the object 8 is used as a controller of a game and the user grasps and moves the object 8 and thereby an operation for the game may be performed. In this case, an image representing a game world can be changed in accordance with a movement of the object 8 or the object 8 can display an image replaced with a virtual object on the photographed image on which the user is reflected.

Alternatively, the user who wears the head-mounted display assembles a plurality of objects 8 before the eyes while viewing an image photographed in a field of view corresponding to the line of sight. In this case, even a mode such that the virtual object corresponding to a result in which the object 8 is assembled appears on the display screen can be realized. Further, it is conceivable that the user puts the plurality of objects 8 on a floor or a desk to thereby define an area in the real space and the information processing apparatus 10 recognizes the area and uses it as a play area of the game.

The display apparatus 16 sequentially acquires the data generated by the information processing apparatus 10 to display the display image or output sounds. The display apparatus 16 may be a general display such as a liquid crystal display and an organic EL (Electroluminescence) display. Further, the display apparatus 16 may be a monitor equipped with a speaker or a television receiver.

Figure 2:
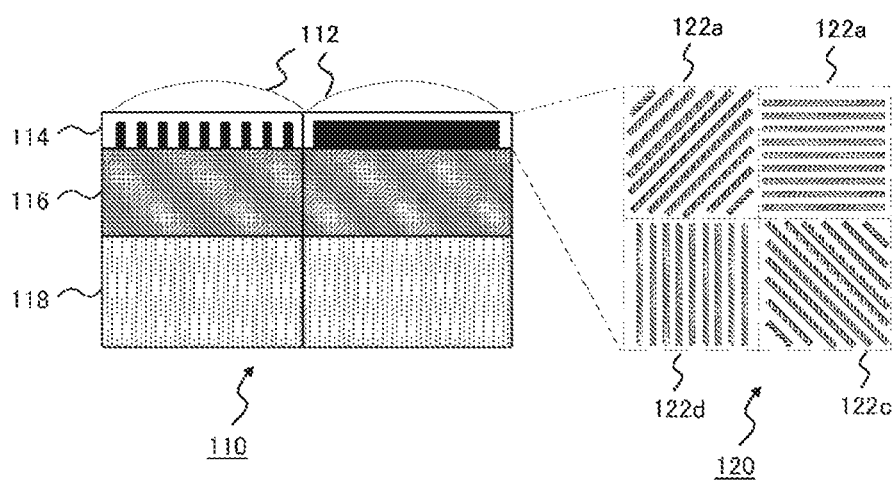
FIG. 2 is a diagram illustrating a structure example of an image pickup device included in an image pickup apparatus according to the embodiment 1.

FIG. 2 illustrates a structure example of an image pickup device included in the image pickup apparatus 12. Note that the figure schematically illustrates a functional structure of a device section and omits a detailed structure of an interlayer insulation film, wiring, and the like. The image pickup device 110 includes a microlens layer 112, a wire-grid polarizer layer 114, a color filter layer 116, and an optical detection layer 118. The wire-grid polarizer layer 114 includes a polarizer in which a plurality of linear conductor members are allowed to be arrayed in a striped shape at an interval smaller than a wavelength of incident light. When light collected by the microlens layer 112 is incident on the wire-grid polarizer layer 114, a polarized component in the direction parallel to a line of the polarizer is reflected and the wire-grid polarizer layer 114 transmits only the polarized component in the direction vertical to the line of the polarizer.

The transmitted polarized component is detected by the optical detection layer 118 to thereby acquire the polarized image. The optical detection layer 118 has a semiconductor device structure of a general CCD (Charge Coupled Device) image sensor, a CMOS (Complementary Metal Oxide Semiconductor) image sensor, or the like. The wire-grid polarizer layer 114 includes an array of polarizers such that a principal axis angle is different in units of reading of charges in the optical detection layer 118, namely, in units of pixels, or in units larger than the pixel units. On the right side, the figure illustrates a polarizer array 120 at the time of viewing the wire-grid polarizer layer 114 from an upper surface.

A line hatched in the figure represents a conductor (wire) constituting the polarizer. Note that dotted rectangles each indicate an area of the polarizer at one principal axis angle and the dotted line itself is not practically formed. In an illustrated example, four sorts of polarizes at the principal axis angle are arranged in four areas 122*a*, 122*b*, 122*c*, and 122*d* in two rows and two columns. In the figure, the principal axis angle of the polarizers on a diagonal line is orthogonal to each other and adjacent polarizers each have a difference of 45 degrees. Specifically, polarizers at four principal axis angles are formed at every 45 degrees.

Each polarizer transmits the polarized component in the direction orthogonal to the direction of wires. Through this process, in the optical detection layer 118 formed on the bottom, polarization information in four directions at every 45 degrees can be obtained in respective areas corresponding to four areas 122*a*, 122*b*, 122*c*, and 122*d*. Polarizer arrays of such four principal axis angles are further allowed to be arrayed by a predetermined number in the vertical direction and in the horizontal direction and peripheral circuits that control timing of charge reading are connected. Thereby, an image sensor that acquires four types of polarization information as two-dimensional data at the same time can be realized.

In the image pickup device 110 illustrated in the figure, the color filter layer 116 is formed between the wire-grid polarizer layer 114 and the optical detection layer 118. The color filter layer 116 includes, for example, arrays of filters that each transmit light of red, green, and blue corresponding to respective pixels. Through this process, the polarization information is obtained by color in accordance with a combination of the principal axis angle of the polarizer in the wire-grid polarizer layer 114 that is located up and down and a color of the filters in the color filter layer 116. That is, the polarization information in the same direction and the same color is discretely obtained on a flat surface of the image. Therefore, the polarization information is appropriately interpolated to thereby obtain the polarized image in each direction and in each color.

Further, both of the polarized images of the same color are calculated to thereby reproduce a non-polarized color image. Image acquisition techniques using a wire-grid polarizer are disclosed, for example, even in JP 2012-80065A or the like. Note, however, that a device structure of the image pickup apparatus 12 according to the present embodiment is not limited to the illustrated device structure. For example, the characteristic amount of the object according to the present embodiment can be acquired by using a polarized luminance image. Therefore, when a color image is not required for other usages, the color filter layer 116 can be omitted. Further, the polarizer is not limited to the wire-grid polarizer; further, the polarizer may be any of polarizers that are put to practical use, such as a linear dichroism polarizer. Alternatively, the above device structure may be a structure in which a polarizing plate in which the principal axis angle is changeable is arranged at the front of a general camera.

Figure 3:
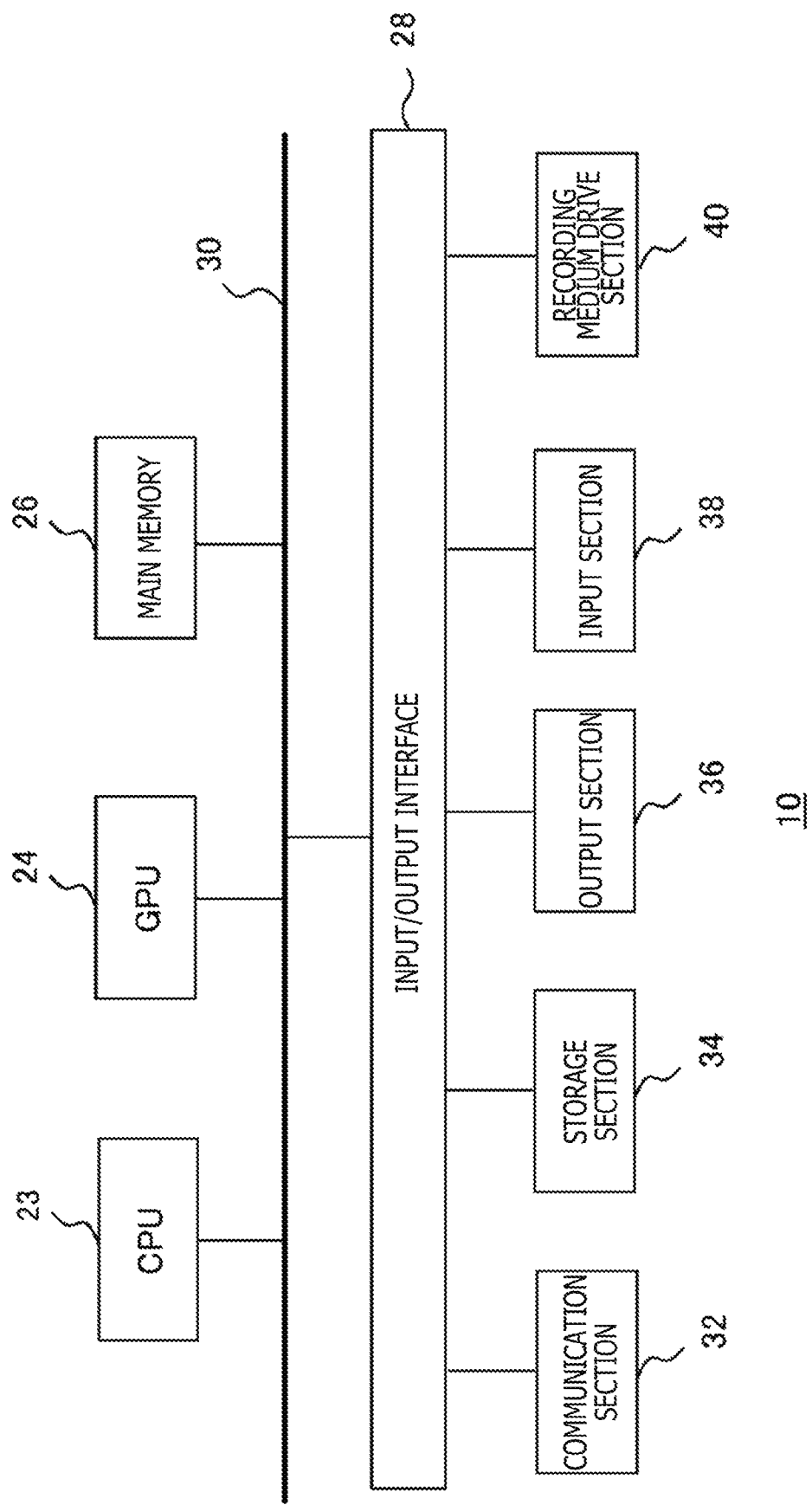
FIG. 3 is a diagram illustrating an internal circuit configuration of an information processing apparatus according to the embodiment 1.

FIG. 3 illustrates an internal circuit configuration of the information processing apparatus 10. The information processing apparatus 10 includes a CPU (Central Processing Unit) 23, a GPU (Graphics Processing Unit) 24, and a main memory 26. Each of them is connected to each other via a bus 30. To the bus 30, an input/output interface 28 is further connected. To the input/output interface 28, there are connected a peripheral device interface such as a USB (Universal Serial Bus) or IEEE (Institute of Electrical and Electronics Engineers) 1394, a communication section 32 composed of network interfaces of a wired or wireless LAN, a storage section 34 such as a hard disk drive or nonvolatile memory, an output section 36 that outputs data to the display apparatus 16, an input section 38 that inputs data from the image pickup apparatus 12 or the input apparatus (not illustrated), and a recording medium drive section 40 that drives a removable recording medium such as a magnetic disk, an optical disk, or a semiconductor memory.

The CPU 23 executes an operating system stored in the storage section 34 and thereby controls the entire information processing apparatus 10. The CPU 23 further executes various programs read out from the removable recording medium and loaded into the main memory 26 or downloaded via the communication section 32. The GPU 24 has a function of a geometry engine and a function of a rendering processor. Further, the GPU 24 performs drawing processing in accordance with a drawing command from the CPU 23 and stores data of a display image in a frame buffer (not illustrated). Then, the GPU 24 converts the display image stored in the frame buffer into video signals and outputs the video signals to the output section 36. The main memory 26 is composed of RAMs (Random Access Memory) and stores programs or data required for processing.

Figure 4:
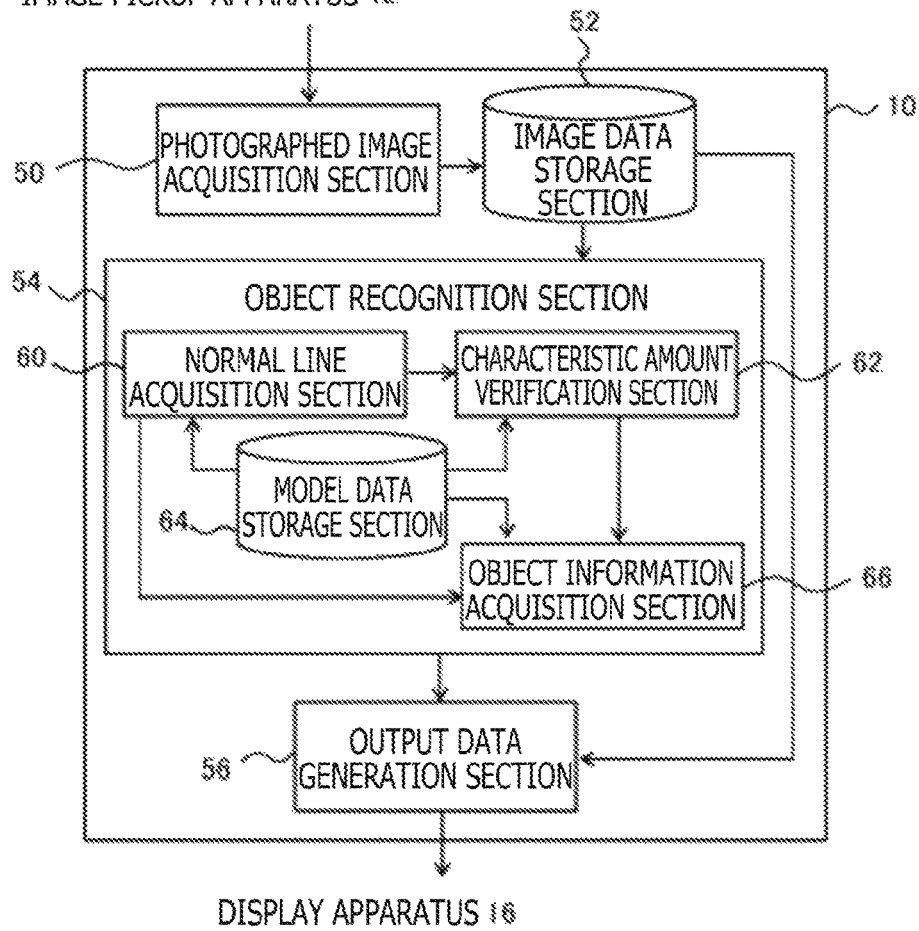
FIG. 4 is a diagram illustrating a functional block configuration of the information processing apparatus according to the embodiment 1.

FIG. 4 illustrates a functional block configuration of the information processing apparatus 10. In terms of hardware, each functional block illustrated in FIG. 4 can be realized by using the configuration of the CPU, GPU, various memories, data bus, and the like illustrated in FIG. 3; further, in terms of software, it can be realized by programs for exerting many functions such as a data input function, data retention function, arithmetic function, image processing function, and communication function loaded from recording mediums or the like into memory. Accordingly, it is understood by those skilled in the art that these functional blocks can be realized in various shapes by using only hardware, only software, or in combination thereof, and are not limited to any one thereof.

The information processing apparatus 10 includes a photographed image acquisition section 50 that acquires data on the photographed image from the image pickup apparatus 12, an image data storage section 52 that stores data on the acquired image, an object recognition section 54 that recognizes information regarding the object 8 by using the photographed image, and an output data generation section 56 that generates data to be output on the basis of the recognized information regarding the object 8. The photographed image acquisition section 50 is realized by using the input section 38, the CPU 23, and the like illustrated in FIG. 3 and acquires data on the photographed image including the polarized image from the image pickup apparatus 12 at a predetermined rate.

As described above, in order to acquire information regarding the object, the photographed image acquisition section 50 acquires at least the polarized image. Further, the photographed image acquisition section 50 may further acquire the non-polarized (natural light) image data on the basis of contents of the information processing performed by the information processing apparatus 10 or the image to be displayed. The image data storage section 52 is realized by the main memory 26 and sequentially stores data on the photographed image acquired by the photographed image acquisition section 50. At this time, the photographed image acquisition section 50 generates the luminance image from the color image and the like, if necessary, and generates and stores also image data required for processing in a subsequent stage.

The object recognition section 54 is realized by the CPU 23, the GPU 24, and the like and acquires necessary information regarding the object by using the image data stored in the image data storage section 52. Information finally acquired here is various depending on a purpose of use of the information processing apparatus 10. For example, the object 8 that exists in the field of view of the image pickup apparatus 12 may be only detected and identified, or the position and orientation thereof may be specified.

In more detail, the object recognition section 54 includes a normal line acquisition section 60, a characteristic amount verification section 62, a model data storage section 64, and an object information acquisition section 66. The normal line acquisition section 60 acquires a normal vector of the object reflected on the polarized image. A method is generally known for finding out a normal line of the object surface on the basis of a change in the luminance of the polarized image as compared with a change in an angle of the polarizer by using the fact that a behavior to a direction of a polarization strength depends on a reflection angle of light from the object. In the present embodiment, the object a color or material of which is given is used and thereby a model used for calculation can be appropriately selected and a normal vector can be found out with high accuracy.

Prior to calculation of the normal vector, the normal line acquisition section 60 may extract an area on which the object is reflected on the polarized image and thereby limit an area for calculating the normal vector. For example, an approximate shape of the object may be registered and an area may be extracted by using a general template matching. When the color image is acquired as the photographed image, even information regarding a color is usable. Alternatively, a thing that exists in a predetermined range within a three-dimensional real space may be specified from a depth image and an area including the image may be extracted.

Here, the depth image is an image in which a distance from an imaging surface of the object is indicated as a pixel value in the photographed image. For example, the depth image is obtained by installing a stereoscopic camera that photographs an object space from left and right points of view with a given interval in the image pickup apparatus 12 and by calculating a distance of a thing indicated by each image on the basis of a principle of a trigonometrical survey from a parallax of the corresponding points in the photographed stereo image. Alternatively, a mechanism for irradiating reference light such as an infrared ray onto the object space and detecting reflected light therefrom may be formed in the image pickup apparatus 12 to calculate the distance by using a TOF (Time of Flight) method.

In a configuration of the image pickup apparatus 12, it is determined at first whether or not the area on which the object is reflected is extracted. If the area is extracted, the configuration may be various depending on the method. For example, when the depth image is used, a general stereoscopic camera that photographs an image in natural light may be installed separately from a polarization camera having an image pickup device structure as illustrated in FIG. 2. Alternatively, one or both of the stereoscopic cameras may be used as the polarization camera.

Alternatively, in a mode in which the user grasps the object 8, the normal line acquisition section 60 may specify an area in which an image of the head of a person is present by general face detection processing. Further, the normal line acquisition section 60 may extract the area in which the image of the object 8 is present from a relatively movable range to the head. Further, the area in which the image is present at the present time may be estimated while adding a time change, on the basis of the recognition result of the object in a previous image frame. In either case, in the present embodiment, information regarding the position and orientation of the object can be obtained in more detail on the basis of the normal vector acquired by using the polarized image. Therefore, the area extraction may be performed here even with a relatively low resolution. When the area extraction is performed, basic data of the object 8 required for the area extraction is stored in the model data storage section 64.

The characteristic amount verification section 62 verifies the normal vector acquired by the normal line acquisition section 60 with a relationship between the normal lines of surfaces essentially given to the polyhedron 8a. When the shape of the polyhedron 8a is determined so that a relationship between the normal lines of surfaces is different in each identification target, the shape of the polyhedron 8a is verified as the characteristic amount with registration information to thereby determine the identification target uniquely. For example, when the plurality of objects are identified, it is most simply conceivable that the total number of surfaces of a regular polyhedron and further an angle formed by adjacent surfaces are made different in each object. The angle formed by the normal vectors of the adjacent surfaces, which is calculated by the normal line acquisition section 60 at this time, is verified as the characteristic amount with the angle registered in each object to thereby specify the observed object.

Further, even in one object, when a polyhedron such that an angle formed by adjacent surfaces is different in each position is used, the angle formed by the normal vectors of surfaces that exist on the side of the image pickup apparatus 12 in the polyhedron can be identified as the characteristic amount. The registration information of the characteristic amount given to each identification target such as objects, surfaces, and sides is stored in the model data storage section 64. The registration information is verified with the observed characteristic amount to thereby specify one identification target.

The object information acquisition section 66 acquires and outputs predetermined information regarding the object 8 on the basis of the verification result by the characteristic amount verification section 62. For example, the object information acquisition section 66 acquires the identification information of the surfaces specified by the characteristic amount verification section 62 and the position and orientation of the object 8 on the basis of the normal vector of the surface. At this time, a normal vector distribution obtained in each surface of the polyhedron 8a may be averaged or the like and calculation based on only angles may be performed. Alternatively, a three-dimensional model of the previously prepared object 8 may be fitted to search a state near to an observation result and results thereof may be used.

In the latter case, the object information acquisition section 66 arranges the three-dimensional model representing the object 8 in a virtual three-dimensional space to which a camera coordinate system corresponding to an image surface is set. Further, the object information acquisition section 66 moves or rotates the three-dimensional model and adjusts the position and orientation so as to conform to the normal vector distribution acquired by the normal line acquisition section 60. The normal vector can be obtained in units of pixels constituting the image of the object 8. Therefore, not only individual normal vector but also a shape of the area represented by the collection of the normal vectors is considered and adjusted. This process permits a positional relationship between the image pickup apparatus 12 and the object 8 to be reproduced with high accuracy in the virtual space.

In this case, in the model data storage section 64, even data of the three-dimensional model of the object 8 is stored. Techniques of a general computer graphics are applicable to the three-dimensional model in the virtual space and a geometric calculation according to the camera. When the plurality of objects 8 exist, the object information acquisition section 66 generates the information regarding the position and orientation in association with the identification information of each object. Thereby, for example, even if a plurality of players take part in a game with respective objects 8, a movement of each player can be discriminated and recognized. Note that when an object that exists in the field of view of the image pickup apparatus is sufficient to be identified from a plurality of object candidates, the identification information of the specified object 8 may be acquired from the characteristic amount verification section 62 only for output.

The output data generation section 56 is realized by using the CPU 23, the GPU 24, the output section 36, and the like. The output data generation section 56 performs predetermined information processing on the basis of information regarding the object acquired by the object recognition section 54 and generates data to be output such as display images or sounds. As described above, contents of the here performed information processing are not particularly limited. For example, the virtual object is drawn in a position of the image of the object 8 on the photographed image. In this case, the output data generation section 56 reads out data of the photographed image from the image data storage section 52. Further, the output data generation section 56 draws the virtual object so as to correspond to the position and orientation of the object specified by the object recognition section 54. The output data generation section 56 outputs output data such as the thus generated display image to the display apparatus 16.

Figure 5:
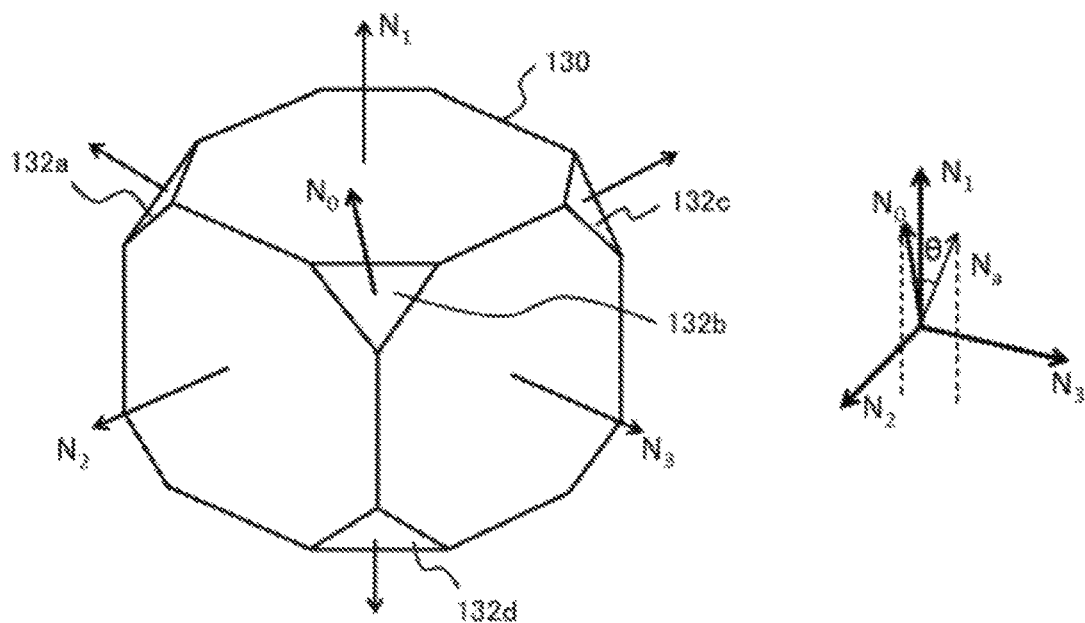
FIG. 5 is a diagram illustrating a polyhedron of an object according to the embodiment 1.

FIG. 5 illustrates a polyhedron of the object according to the present embodiment. A polyhedron 130 illustrated in this example is a 14-hedron that includes triangular cross sections (e.g., surfaces 132a, 132b, 132c, and 132d) formed by cutting eight vertex portions of the cube. Here, the polyhedron 130 has a constraint condition such that six surfaces of the original cube are orthogonal to each other. By contrast, any inclination can be given to the triangular cross sections in a range in which they are not orthogonal to six surfaces of the original cube. The above is used, six surfaces of the original cube are used as a reference, and characteristics are represented in each triangular cross section by the inclination to six surfaces of the original cube.

Afterwards, like six surfaces of the cube, a surface to be a reference in which an angle formed by the surfaces has a given constant is referred to as a reference surface and a surface in which an inclination is variable like the triangular cross section and thereby characteristics are represented is referred to as a characteristic surface. As described below, various variations are considered as an angle formed by both of the reference surfaces and a shape of the characteristic surface. In the case of the polyhedron 130 illustrated in FIG. 5, when the normal lines of three reference surfaces adjacent to the characteristic surface are used as a coordinate axis of the reference and when a Miller index used in a field of solid-state physics is used, it is conceivable that, for example, eight sorts of (111), (112), (122), (123), (133), (233), (134), and (234) are present as a plane orientation of the characteristic surface.

As described above, orientations of all the characteristic surfaces are made different and the normal vectors of the characteristic surfaces and the normal vectors of the reference surfaces are compared with each other. Thereby, an image on the photographed image represents any of the characteristic surfaces of the polyhedron can be specified. Specifically, for example, when the photographed image is obtained in the field of view illustrated in the figure, the normal vectors as illustrated in arrows are acquired by the normal line acquisition section 60. Then, the characteristic amount verification section 62 first extracts normal vectors $N_1$, $N_2$, and $N_3$ of the reference surfaces having an orthogonal relationship. Next, the normal vector $N_0$ having another angle is extracted in the area surrounded by images in which the normal vectors are acquired, namely, images of the reference surfaces.

As extracted and illustrated on the right side of the figure, an angle $\theta$ formed by an average vector $N_a=(N_1+N_2+N_3)/3$ of the normal vectors $N_1$, $N_2$, and $N_3$ of the reference surfaces and the normal vector $N_0$ of the characteristic surface is found as a characteristic angle. Note that the average vector $N_a$ corresponds to the normal vector of a surface of a Miller index (111) and therefore when an orientation of the characteristic surface is (111), the characteristic angle $\theta=0$ holds. When the orientations of the characteristic surfaces are made different as described above, the characteristic angle $\theta$ is different in each characteristic surface and in the result the characteristic surface 132b is uniquely determined.

Figures 6, 7:
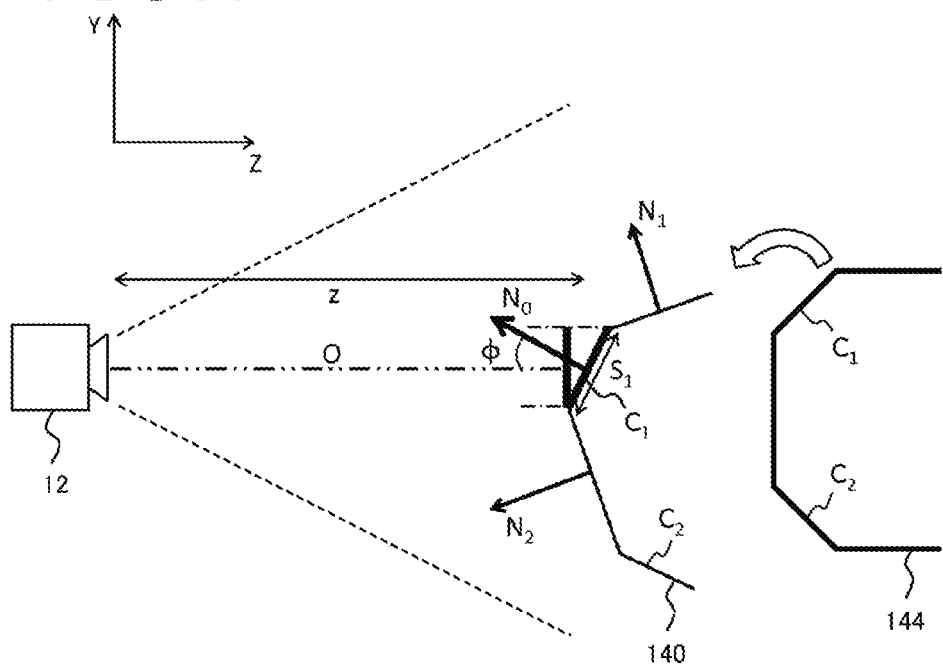
FIG. 6 is a diagram illustrating a structure example of registration data of a characteristic amount, which is stored in a model data storage section according to the embodiment 1.
FIG. 7 is a diagram describing processing in which an object information acquisition section acquires an orientation and position of the object according to the embodiment 1.

FIG. 6 illustrates a structure example of the registration data of the characteristic amount, which is stored in the model data storage section 64. Characteristic angle data 300 includes a surface ID column 302 and a characteristic angle column 304. In the surface ID column 302, identification information given by a predetermined rule to represent a position of the polyhedron in the characteristic surface formed in the polyhedron is stored. In the case of the figure, the identification information from "$C_1$" to "$C_8$" is given to eight characteristic surfaces. However, the number of entries is different depending to the number of the characteristic surfaces to be formed. It is assumed that a relationship between a position and identification information number in the polyhedron is separately defined.

In the characteristic angle column 304, the characteristic angle θ of each characteristic surface is stored. In the figure, $\theta_1$ to $\theta_8$ are written; however, an angle is practically set by a numerical value. Further, the characteristic angle may be indicated by a combination of an azimuthal angle and a zenithal angle etc. using as a reference the average vector $N_a$ described above. As described above, the characteristic amount verification section 62 extracts the normal vectors of three reference surfaces and the characteristic surface surrounded by the three reference surfaces from among the normal vectors obtained from the photographed image. Further, the characteristic amount verification section 62 calculates the characteristic angle of the normal vector and then acquires the identification information of the characteristic surface with reference to the characteristic angle data 300.

One piece of the characteristic angle data 300 has been created in a polyhedron having one shape. In other words, in order to discriminate the objects 8 grasped by a plurality of players, the polyhedron 8a is prepared with shapes of a plurality of sorts. In this case, the polyhedron 8a is formed so that the characteristic angle is not overlapped and the characteristic angle data 300 is created for each shape of the polyhedron 8a. Note, however, that a case in which the object 8 is discriminated on the basis of an attribute other than shapes such as a color is not limited thereto. Alternatively, even if the object 8 is discriminated by the shape, the attribute other than the characteristic angle may be introduced separately.

For example, a rectangular parallelepiped is used as a reference in place of the cube used as a reference illustrated in FIG. 5 and a ratio of side lengths of three axes may be made different to thereby discriminate the objects mutually. Even other than the rectangular parallelepiped, when a side length of the reference surface is different in the shape, the object can be discriminated on the basis of a ratio of a side of at least any one surface.

In this case, information regarding the ratio of side lengths of the polyhedron is associated with the characteristic angle data 300 illustrated in FIG. 6. At the same time, a relationship between the position and side of each characteristic surface is considered and the identification information of the characteristic surface is determined. When the object 8 is discriminated by the ratio of the side length, at least a portion of the characteristic angle may be overlapped depending on the shape of the object 8. In addition, the model data storage section 64 may store a color and material of the polyhedron. Further, the stored color and material may be appropriately used for a selection of the model, an extraction of the image, a discrimination of the object 8, and the like at the time when the normal line acquisition section 60 calculates the normal vector from the polarized image.

FIG. 7 is a diagram describing processing in which the object information acquisition section 66 acquires an orientation and position of the object 8. The figure illustrates a situation in which the image pickup apparatus 12 and the polyhedron 140 are viewed from the side surface. As described with reference to FIG. 5, a characteristic surface $C_1$ directed to the image pickup apparatus 12 side is uniquely found out on the basis of the characteristic angle among eight characteristic surfaces (e.g., $C_1$ and $C_2$). Further, the normal vector $N_0$ of the characteristic surface $C_1$ is found out in the three-dimensional real space, and therefore the orientation of the polyhedron that conforms to the normal vector $N_0$ is uniquely determined.

In the illustrated example, conceptually, a situation such that a model shape 144 originally given to the polyhedron is fitted to the observed characteristic surface $C_1$ and the normal vector $N_0$ thereof is illustrated with a white arrow. Further, the orientation may be practically found out from only an angle calculation. Alternatively, in more detail, a distribution of the normal vectors obtained in units of pixels may be considered and the model shape 144 in which a difference is minimized may be searched to thereby find out the position and orientation. Note that the figure illustrates a two-dimensional space using a Y axis representing a vertical direction of the field of view and a Z axis representing a distance from an imaging surface. Naturally, even an axis (X axis) direction representing a horizontal direction of the field of view is considered as a target of calculation.

Further, since even a shape and size of the characteristic surface $C_1$ are given, a distance from the imaging surface to the polyhedron can be found out on the basis of an appearance size of the characteristic surface $C_1$. Specifically, in a two-dimensional plane of the figure, when an angle formed by the normal line $N_0$ of the characteristic surface $C_1$ and the optical axis O of the image pickup apparatus 12 is set to φ and a practical size (length) of the characteristic surface $C_1$ is set to $S_1$, a distance z of the polyhedron 140 from the imaging surface is found out by using the following expression from a size (length) $S_{im}$ of an image in the photographed image.

$$z = S_1 \cos \varphi / S_{im}$$

The image of the object in a camera coordinate system is reversely projected in accordance with the found-out distance z to thereby calculate a position of the object 8 in the real space. Note that when the three-dimensional object is prepared and fitted, another method can be used by using a conversion expression of a computer graphics, for example, fitting to a normal vector distribution and fitting to an image in the photographed image are performed at the same time.

When the polyhedron is introduced into the object and an image in the photographed image and surfaces of the polyhedron are associated with each other, even if the polyhedron is freely rotated, a state of the polyhedron can be accurately specified. Therefore, as compared to a marker of a spherical form or a cube etc., more information can be acquired and further information processing can be diversified by using the more information. Further, when one characteristic surface and the reference surfaces surrounding the characteristic surface are photographed, the position and orientation can be specified. Therefore, the polyhedron has high robustness against a change in conditions that a portion of persons or other things are hidden or the like.

In the past, studies have been conducted on the techniques for acquiring various pieces of information regarding the object by using the polarized image. One method for founding out a normal vector of the object surface is disclosed, for example, by Gary Atkinson and Edwin R. Hancock in "Recovery of Surface Orientation from Diffuse Polarization," IEEE Transactions on Image Processing, June 2006, 15 (6), pp. 1653-1664, and in JP 2009-58533A. These techniques may be adopted as needed for the present embodiment. What follows is an outline of the techniques.

The luminance of the light observed via a polarizer varies with respect to the principal axis angle $\theta_{pol}$ of the polarizer, as expressed by the following expression:

[Math. 1]

$$I = \frac{I_{max} + I_{min}}{2} + \frac{I_{max} - I_{min}}{2}\cos(2(\theta_{pol} - \phi)) \quad \text{(Expression 1)}$$

Here, $I_{max}$ and $I_{min}$ represent, respectively, a maximum value and a minimum value of the observed luminance, and φ denotes a polarization phase. As described above, when the polarized images are acquired for four principal axis angles $\theta_{pol}$, the luminance I of the pixels at the same position satisfies the mathematical expression 1 above with respect to each principal axis angle $\theta_{pol}$. Thus by approximating a curve passing through the coordinates (I, $\theta_{pol}$) with a cosine function using a least square method, for example, it is possible to find out the values $I_{max}$, $I_{min}$, and cp. The values $I_{max}$ and $I_{min}$ thus found-out are used to find out a polarization degree p with the following mathematical expression:

[Math. 2]

$$\rho = \frac{I_{max} - I_{min}}{I_{max} + I_{min}} \quad \text{(Expression 2)}$$

A normal line of the subject surface may be expressed using an azimuthal angle α indicative of the angle of the incidence plane of light (emission plane in the case of diffuse reflection) and a zenithal angle θ indicative of the angle over the surface. According to a dichroic reflection model, the spectrum of reflected light is expressed by the linear sum of specular reflection and diffuse reflection spectrums. Here, specular reflection signifies the light regularly reflected from an object surface, and diffuse reflection denotes the light diffused by pigment particles including an object. The above-mentioned azimuthal angle α represents the principal axis angle that gives the minimum luminance $I_{min}$ with the mathematical expression 1 above in the case of the specular reflection, or the principal axis angle that gives the maximum luminance $I_{max}$ with the mathematical expression 1 in the case of the diffuse reflection.

The zenithal angle θ is in the following relationships with the polarization degree $\rho_s$ in the case of the specular reflection and with the polarization degree $\rho_d$ in the case of the diffuse reflection:

[Math. 3]

$$\rho_s = \frac{2\sin^2\theta\cos\theta\sqrt{n^2 - \sin^2\theta}}{n^2 - \sin^2\theta - n^2\sin^2\theta + 2\sin^4\theta}$$

$$\rho_d = \frac{(n - 1/n)^2 \sin^2\theta}{2 + 2n^2 - (n + 1/n)^2 \sin^2\theta + 4\cos\theta\sqrt{n^2 - \sin^2\theta}}$$

(Expression 3)

Here, n stands for the refractive index of the subject. The zenithal angle θ is obtained by substituting the polarization degree ρ obtained with the mathematical expression 2 for either $\rho_s$ or $\rho_d$ in the mathematical expression 3. A normal vector ($p_x$, $p_y$, $p_z$) is obtained with the following mathematical expression by using the azimuthal angle α and the zenithal angle θ obtained as described above:

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix} \quad \text{(Expression 4)}$$

In the manner described above, the normal vector of the subject reflected on the pixel of the polarized image is found out from the relationship between the luminance I represented by each pixel of the polarized image and the principal axis angle $\theta_{pol}$ of the polarizer. This provides a normal vector distribution of the entire image. Note, however, that as described above, a specular reflection component and a diffuse reflection component are included in the observed light and a method for calculating the normal vector is different in accordance with the above. Therefore, preferably, appropriate model is selected between the specular reflection and the diffuse reflection on the basis of materials and colors of the object 8.

FIGS. 8 and 9 illustrate polyhedrons that can be used for the object 8 according to the present embodiment. First, in the same manner as in FIG. 5, a polyhedron 152 illustrated in FIG. 8 is a 14-hedron in which eight vertexes of a cube 150 is cut and triangular cross sections are set to the characteristic surface. In this case, as described above, the characteristic surface is specified from an angle formed by the average vector of the normal vectors $N_1$, $N_2$, and $N_3$ of the reference surfaces and the normal vector $N_0$ of the characteristic surface surrounded by the reference surfaces.

A polyhedron 156 is an 8-hedron in which four vertexes of a regular tetrahedron 154 is cut and triangular cross sections are set to the characteristic surface. Even in this case, each characteristic surface is formed so that angles are different against three peripheral reference surfaces to thereby identify the characteristic surface by the same principle as that of the polyhedron 152. That is, an angle formed by the normal vector of each surface of the original regular tetrahedron 154 is given, and therefore the normal vectors (e.g., the normal vectors $N_1$, $N_2$, and $N_3$) that satisfy such a relationship are first extracted. Then, the characteristic surface can be specified from an angle formed by the average vector of the above normal vectors and the normal vector $N_0$ of the characteristic surface surrounded by the reference surfaces represented by the normal vectors. Note that as illustrated in the figure, only two surfaces of the reference surfaces are photographed depending on the orientation of the polyhedron 156. In this case, an angle formed by the average vector of the normal vectors $N_1$ and $N_2$ and the normal vector $N_0$ of the characteristic surface may be set to the characteristic angle. Alternatively, an acquisition of the characteristic angle may be interrupted until three surfaces of the reference surfaces appear. The other shapes are similar to the above.

A polyhedron 160 illustrated in FIG. 9 is a 14-hedron in which six vertexes of a regular octahedron 158 are cut and quadrangular cross sections are set to the characteristic surface. Even in this case, each characteristic surface is formed so that angles are different against four peripheral reference surfaces to thereby identify the characteristic surface by the same principle as that of the polyhedron 152.

That is, an angle formed by the normal vector of each surface of the original regular octahedron 158 is given, and therefore the normal vectors (e.g., the normal vectors $N_1$, $N_2$, $N_3$, and $N_4$) that satisfy such a relationship are first extracted. Then, the characteristic surface can be specified from an angle formed by the average vector of the above normal vectors and the normal vector $N_0$ of the characteristic surface surrounded by the reference surfaces represented by the normal vectors.

A polyhedron 164 is a 32-hedron in which twenty vertexes of a regular dodecahedron 162 are cut and triangular cross sections are set to the characteristic surface. Even in this case, each characteristic surface is formed so that angles are different against three peripheral reference surfaces to thereby identify the characteristic surface by the same principle. That is, an angle formed by the normal vector of each surface of the original regular dodecahedron 162 is given, and therefore the normal vectors (e.g., the normal vectors $N_1$, $N_2$, and $N_3$) that satisfy such a relationship are first extracted. Then, the characteristic surface can be specified from an angle formed by the average vector of the above normal vectors and the normal vector $N_0$ of the characteristic surface surrounded by the reference surfaces represented by the normal vectors.

Note that an original solid is not limited to the illustrated solid when an angle formed by both of the reference surfaces constituting the solid is given. Note, however, that a regular polyhedron as illustrated in the figure is preferable from a standpoint that the characteristic surface can be evenly arranged, the characteristic surface and the reference surface can be easily discriminated from a relationship of the normal vectors, or the like. Even in any polyhedron, a plurality of characteristic surfaces may be photographed depending on the orientation at the same time.

In this case, one characteristic surface may be only specified or the same calculation and verification may be performed to all the characteristic surfaces. Alternatively, reliability of specific processing may be estimated on the basis of the fact that how much area the peripheral reference surfaces and the characteristic surface itself are photographed with. Further, only the characteristic surface in which predetermined reliability is obtained may be set to processing target. A weight or priority may be given to usage of results in accordance with the reliability. As the number of the specified characteristic surfaces is larger qualitatively, information thereof is integrated and the position and orientation of the entire object can be found out with high accuracy.

Figure 10:
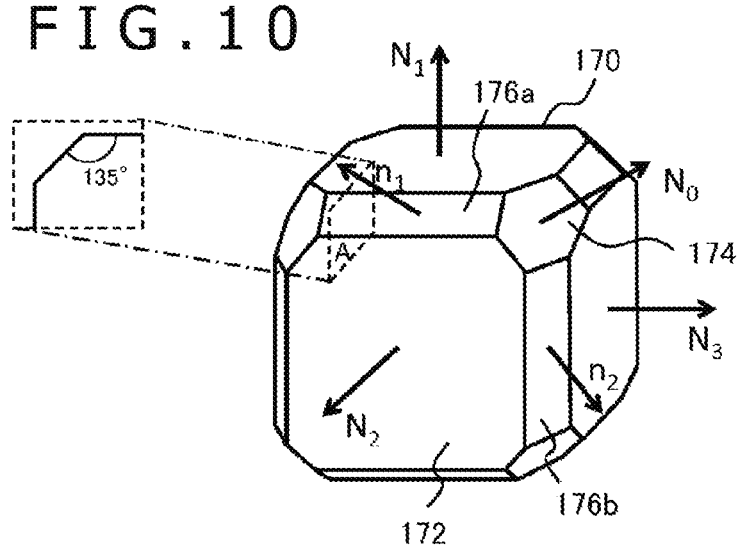
FIG. 10 is a diagram illustrating another example of the polyhedron that can be used as the object according to the embodiment 1.

FIG. 10 illustrates another example of a polyhedron capable of being used as the object 8 according to the present embodiment. A polyhedron 170 is a 32-hedron in which eight surfaces formed by cutting portions including respective sides in parallel to the sides so as to have a predetermined angle between newly formed surfaces and the reference surfaces contacted with the portions are newly included the polyhedron 130 formed by cutting the vertexes of the cube illustrated in FIG. 5. In the figure, as indicated in a cross section of a surface A, respective surfaces are formed so that an angle between the newly formed surface and the reference surface is 135 degrees.

In the calculation processing of the normal vector generally using the polarized image, an angle such that the reliability of the obtained normal vector is reduced is present. Specifically, in a state in which the normal vector of the subject is overlapped with the optical axis of the image pickup apparatus 12, orientation dependence of the observed polarized luminance becomes small. Therefore, in the calculation process of the normal vector, an influence of noises is easy to receive. Accordingly, it is conceivable that in a state in which the reference surface 172 faces an imaging surface of the image pickup apparatus 12, for example, the reliability of the normal vector $N_2$ is reduced. Further, the characteristic angle of the characteristic surface 174 is not correctly obtained, and the characteristic surface 174 is not detected in some cases.

To solve the above problem, a surface is formed in which a side portion is cut as described above and that has an intermediate angle between the reference surfaces. When performing the above, during the period in which the reference surface faces the imaging surface, four surfaces (e.g., surfaces 176a and 176b) around the reference surface each have a preferable angle to calculate the normal vector. Accordingly, the normal vectors $n_1$, $n_2$, . . . of the four surfaces are acquired and averaged and thereby even the normal vector $N_2$ of the reference surface is found out with high accuracy.

In the result, the normal vector of the reference surface can be stably acquired regardless of the orientation of the polyhedron. Even in this shape, processing in which the characteristic angle is found out from the normal vectors $N_1$, $N_2$, and $N_3$ of the reference surfaces and the normal vector $N_0$ of the characteristic surface 174 to identify the characteristic surface is in the same manner as in the above-described processing. The illustrated example is based on the cube. Further, in any of the polyhedrons illustrated in FIGS. 8 and 9, a surface having an intermediate angle between the reference surfaces is formed to thereby obtain the same effect.

Figure 11:
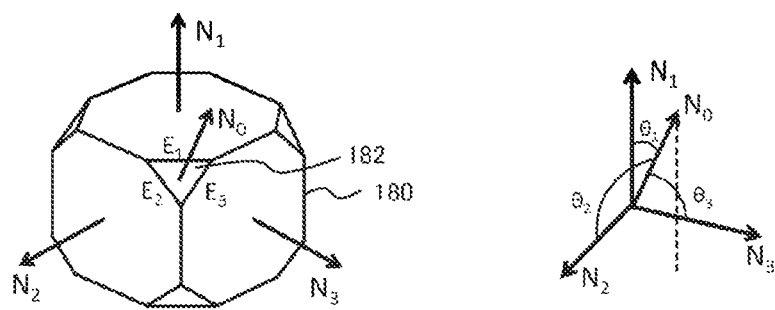
FIG. 11 is a diagram describing a mode of giving characteristics to each side of a characteristic surface according to the embodiment 1.

According to the mode described up to now, the characteristic surface having characteristics at an inclination angle is formed in the solid as a base such as the cube and the identification is realized in units of surfaces by using an angle formed by the reference surfaces around the characteristic surface. Here, an inclination of the characteristic surface is further devised to thereby give characteristics to each side of the characteristic surface. FIG. 11 is a diagram describing the mode of giving the characteristics to each side of the characteristic surface. The example illustrates the same polyhedron 180 as the polyhedron 130 illustrated in FIG. 5. Further, the normal vectors $N_1$, $N_2$, and $N_3$ of the reference surfaces and the normal vector $N_0$ of the characteristic surface 182 surrounded by the reference surfaces are obtained by using the same processing.

Here, as extracted and illustrated on the right side of the figure, angles formed by the normal vector $N_0$ of the characteristic surface 182 and the normal vectors $N_1$, $N_2$, and $N_3$ of three reference surfaces around the characteristic surface 182 are defined as $\theta_1$, $\theta_2$, and $\theta_3$, respectively. A characteristic surface is formed with an inclination such that all of $\theta_1$, $\theta_2$, and $\theta_3$ are different and further the angles are not overlapped even in all the characteristic surfaces. For example, three normal lines of the reference surfaces contacted with the characteristic surface are set to coordinate axes of the reference. In this case, the characteristic surfaces are formed in plane orientations that indicate Miller indexes (123), (124), (125), (134), (135), (145), (234), and (235).

In this way, from an angle formed by the normal vectors of the characteristic surface and one reference surface adjacent to the characteristic surface, a side in a boundary of those surfaces can be uniquely determined. For example, the characteristic angle of a side $E_1$ of the characteristic surface 182 is the angle $\theta_1$ formed by the normal vector $N_0$ and the normal vector $N_1$, the characteristic angle of a side $E_2$ of the characteristic surface 182 is the angle $\theta_2$ formed by the normal vector $N_0$ and the normal vector $N_2$, and the characteristic angle of a side $E_2$ of the characteristic surface 182 is the angle $\theta_3$ formed by the normal vector $N_0$ and the normal vector $N_3$.

FIG. 12 illustrates a structure example of the registration data of the characteristic amount, which is stored in the model data storage section 64 at the time of giving the characteristic amount to each side. Characteristic angle data 310 includes a side ID column 312 and a characteristic angle column 314. In the side ID column 312, identification information that is given to each side of the characteristic surface in a predetermined rule indicating a position of each side is stored. In the case of the figure, while assuming eight triangular characteristic surfaces, the identification information of "$E_1$" to "$E_{24}$" is given to 24 sides in total. The number of entries is different depending on the number of the formed characteristic surfaces and the shape thereof. A relationship between positions of the characteristic surfaces in the polyhedron, positions of the sides in each characteristic surface in the polyhedron, and an identification information number is assumed to be separately defined.

As described above, in the characteristic angle column 314, an angle formed by the normal vectors of the characteristic surface and reference surface adjacent to each other so as to sandwich the side is stored as the characteristic angle. In the figure, "$\theta_1$" to "$\theta_{24}$" are written and practically the angles are set to numerical values. The characteristic amount verification section 62 extracts the normal vector of at least one reference surface and the normal vector of the characteristic surface adjacent to the reference surface from among the normal vectors obtained from the photographed images. Further, the characteristic amount verification section 62 acquires the identification information of the sides as a boundary of those surfaces with reference to the characteristic angle data 310 based on the formed angles. When one side can be identified, the characteristic surface the identified side of which is one side can be specified. Therefore, the position and orientation of the entire object 8 can be acquired in the same manner as in the illustration with reference to FIG. 7.

Further, the same specific processing can be performed on a plurality of photographed sides and acquisition accuracy of the position and orientation can be improved. According to this mode, the normal vectors of at least two surfaces just have to be obtained. Therefore, the robustness further becomes higher against hiding of the object than that of the mode of giving the characteristic angle to surfaces. In two adjacent areas, for example, when an angle formed by the normal vectors is any one of the characteristic angles $\theta_1$ to $\theta_{24}$ of the set sides, a boundary line of the area can be specified as any one of the sides E1 to E24.

Note, however, that when only two surfaces are photographed, it is difficult to discriminate the reference surface and the characteristic surface only on the basis of the normal vectors. Therefore, when the discrimination between the reference surface and the characteristic surface is required, it may be estimated from a shape or size of an image of the photographed image. Alternatively, while more surfaces are photographed, images of the reference surface and the characteristic surface may be specified and the discrimination may be estimated by using follow-up results. Note that an example illustrated in FIG. 11 is based on the cube, and further even if any one of the polyhedrons illustrated in FIGS. 8 and 9 is used, the mode of identifying sides from the characteristic angle is applicable in the same manner.

Figure 13:
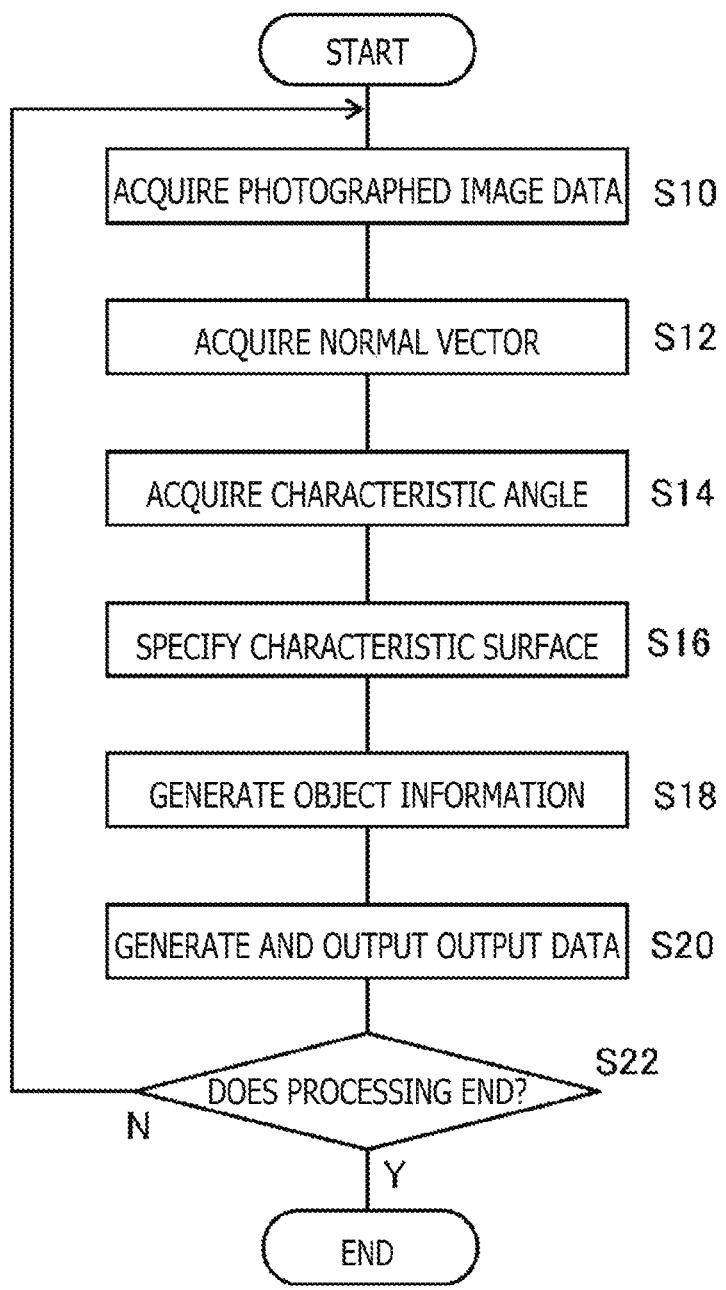
FIG. 13 is a flowchart illustrating a processing procedure in which the information processing apparatus according to the embodiment 1 acquires information regarding the object by using a polarized image and generates and outputs output data.

Next, operations of the information processing apparatus to be realized by the configuration described above will be described. FIG. 13 is a flowchart indicating a processing procedure in which the information processing apparatus 10 according to the present embodiment acquires information regarding the object 8 by using the polarized image and generates and outputs output data. The flowchart is started at the time when the user requires a start of the processing for the information processing apparatus 10 and the image pickup apparatus 12 starts photographing a space including the object 8 in accordance with the requirement.

The photographed image acquisition section 50 first acquires data of the photographed image from the image pickup apparatus 12 (S10). An image in natural light may be included in the data in addition to the polarized image corresponding to a plurality of principal axis angles. The image pickup apparatus 12 or the information processing apparatus 10 may calculate both of the polarized images to thereby create an image in natural light. Further, when housing various sensors such as an acceleration sensor, the image pickup apparatus 12 may acquire a measurement result thereof.

Next, the normal line acquisition section 60 acquires the normal vector of the object by using the polarized image (S12). At this time, an area in which an image of the object 8 appears among the photographed images may be first extracted from the images in natural light or the polarized images on the basis of a color or shape thereof. Next, the characteristic amount verification section 62 extracts the normal vectors of the reference surface and the characteristic surface on the basis of a relationship between the angles of the normal vectors to thereby acquire the characteristic angle (S14). Then, a characteristic surface reflected on the photographed image is specified on the basis of the characteristic angle (S16).

When an angle formed by an average vector of the normal vectors of three reference surfaces and the normal vector of the characteristic surface surrounded by the reference surfaces is defined as the characteristic angle, the characteristic surface is directly found out. When the angle formed by the normal vectors of the characteristic surface and the reference surfaces adjacent to the characteristic surface is defined as the characteristic angle, boundary sides of the surfaces are specified to thereby find out the characteristic surface. The object information acquisition section 66 generates information regarding the object 8 on the basis of the specified characteristic surface (S18). For example, the object information acquisition section 66 acquires the position and orientation of the object 8 on the basis of the normal vector of the specified characteristic surface and the images of the photographed image.

At this time, the above information may be acquired from only a numerical calculation of angles or sizes on the basis of an accuracy required for processing of a subsequent stage. Alternatively, the position and orientation of a three-dimensional object may be adjusted in the virtual space so as to conform to the normal vector distribution or a shape of an image of the photographed image. In addition, when the information regarding the position and orientation is obtained from sensors housed in the object 8, the accuracy may be improved by integrating the above information with the information regarding the position and orientation. When the depth image is obtained by using a stereoscopic camera or the like, the above information may be integrated with positional information represented by the depth image. When the plurality of objects exist, the information regarding the position and orientation is generated in each object and the information is associated with the identification information of the object.

The output data generation section 56 acquires the information and promotes a game on the basis of the information or draws the virtual object on the photographed image. Then, the output data generation section 56 generates the output data of a display image or a sound and outputs the output data to the display apparatus 16 (S20). If the processing need not be stopped by using a user operation or the like (N in S22), the processes from S10 to S20 are repeated to follow-on image frames. On this occasion, the information obtained to the previous image frame may be used and efficiency may be realized, for example, an area of the processing target is limited or the like. Through the processes, a game screen according to movements of the subject and results of the information processing are displayed as moving images. If the processing needs to be stopped by the user operation etc., all the processes end (Y in S22).

According to the present embodiment described above, a polyhedron including the reference surfaces in which angles formed by the reference surfaces are given and the characteristic surface in which angles are made to have characteristics is used as the operation object for an input means. Specifically, the normal vector is calculated from the polarized image in which the operation object is photographed. Further, a relationship between the calculated normal vector and the normal vectors of the reference surfaces is defined as the characteristic amount and thereby the characteristic surface reflected on the photographed image is uniquely specified. When the characteristic surface is specified, the position and orientation of the entire object can be acquired, for example, from a relationship between the characteristic surface and the normal vector. Briefly, as compared with a marker having a simple shape such as a spherical form, more information can be acquired.

Further, when any one characteristic surface and the reference surfaces around the characteristic surface are reflected, it is possible to perform specific processing. Therefore, even if conditions are changed, for example, the operation object protrudes from the field of view of the image pickup apparatus or the operation object is hidden by other persons or things, it is possible to perform stable information processing. Further, since the normal vector is obtained in units of pixels of the polarized image, a surface is comprehended as a collection of the normal vectors and the characteristic surface and the reference surfaces can be detected with high accuracy.

For example, even if the operation object is separated from the image pickup apparatus and an appearance size becomes small, the detection accuracy of the surface is easy to maintain. Therefore, dependence on the attribute other than a shape such as a color can be reduced. Further, the necessity of measures of permitting the operation object to emit light and making the operation object conspicuous or the like is reduced. As a result, it is possible to suppress cost of manufacturing or power consumption of the operation object.

Embodiment 2

In the embodiment 1, an individual object in which characteristics are given to an angle formed by a plurality of surfaces from the first is used as a target. Further, an angle observed on the basis of the normal vector is verified with the registration data and thereby a state of the object is acquired to use the state of the object for information processing. In the present embodiment, an angle formed by the plurality of surfaces is directly used as input information for the information processing. Specifically, a controller in which an angle in a portion of site is valuable is introduced as the operation object and processing is performed in accordance with the observed angle.

Figure 14:
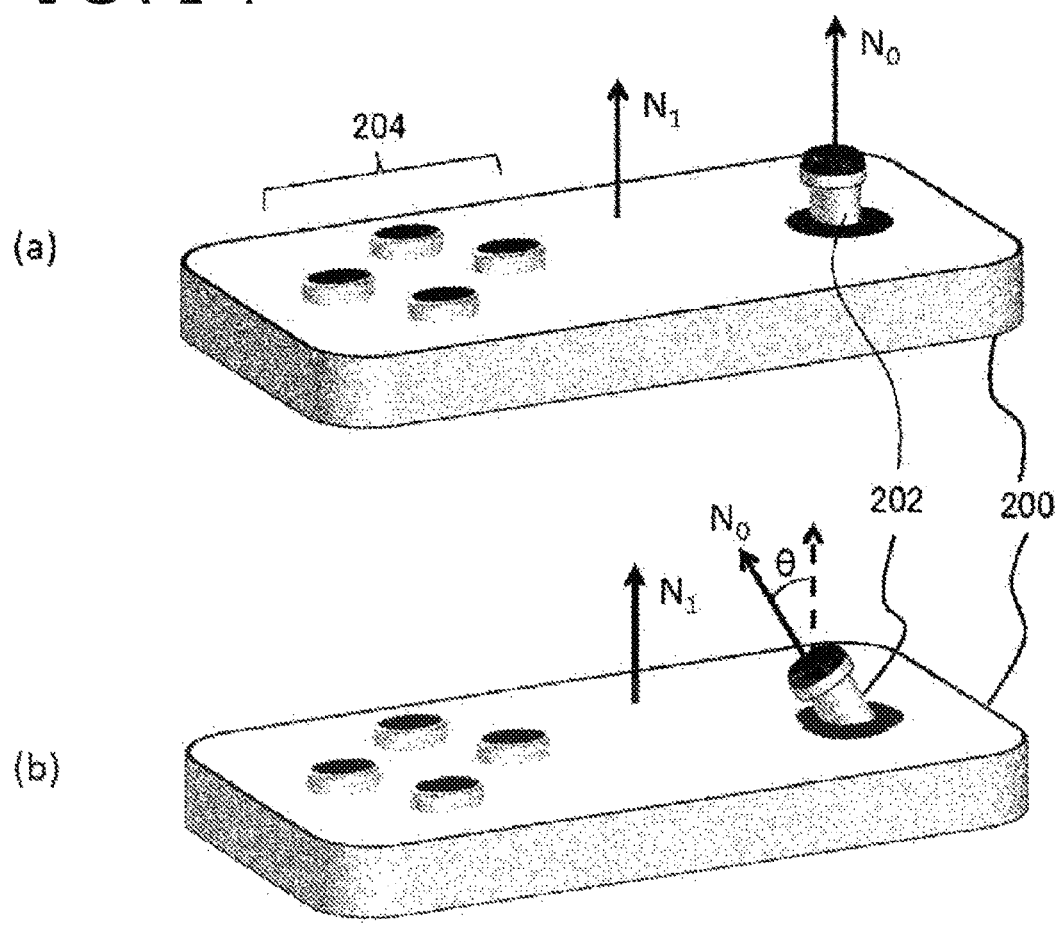
FIG. 14 is a diagram describing an example of a method for directly using an angle formed by a plurality of surfaces and performing information processing according to an embodiment 2.

FIG. 14 is a diagram describing an example of a method for directly using an angle formed by a plurality of surfaces and performing the information processing in the present embodiment. In this example, using a controller including a joystick, a content of the user operation is interpreted on the basis of a change in the angle and the information processing is performed. A controller 200 includes a joystick 202 capable of being inclined in any direction and a plurality of buttons 204 in a parallel-plate casing having a predetermined thickness. Note, however, that an operation means other than the joystick 202, a layout of the operation means, and a shape of the casing are not limited to the illustrated shapes. The controller 200 may include only the joystick 202.

The joystick is generally used to acquire an inclination direction and an inclination amount by sensors or various circuits formed inside the controller, scroll a screen in a corresponding direction and amount, and move the displayed object. In the present embodiment, the inclination direction and the inclination amount of the joystick 202 are acquired by using the normal vector obtained from the polarized image obtained by photographing the controller 200. Therefore, a circuit for the joystick, and the like are not formed inside the controller 200 and the information processing can be realized in accordance with operations. Note that when the buttons 204 are formed in the controller 200, a circuit configuration thereof may be in the same manner as in a general controller.

In the figure, FIG. 14 (*a*) illustrates a state in which the joystick 202 is neutralized. In this case, the normal vector $N_1$ of the top surface of the casing of the controller 200 and the normal vector $N_0$ of the top surface of the joystick 202 are parallel to each other. By contrast, FIG. 14 (*b*) illustrates a state in which the joystick 202 is inclined. In this case, the normal vector $N_0$ of the top surface of the joystick 202 has an inclination of an angle $\theta$ to the normal vector $N_1$ of the top surface of the casing of the controller 200. Note that the angle $\theta$ is practically obtained with two components of an azimuthal angle and a zenithal angle. The azimuthal angle and the zenithal angle correspond to the inclination direction and the inclination angle, respectively.

It is conceivable that fingers of the user are put on the top surface of the joystick 202 when operating the joystick 202. In this case, when it is considered that the top surface of the fingers and the top surface of the joystick 202 are operated at the same time while keeping a state in which they are approximately parallel to each other, the angle can be specified in the same manner regardless of the presence or absence of the fingers. The relationship between the normal vectors $N_1$ and $N_0$ is the same as that between the normal vectors of the reference surface and the characteristic surface according to the embodiment 1. Further, a method for acquiring the normal vectors of the reference surface and the characteristic surface from the polarized image may be the same as that according to the embodiment 1. Specifically, a collection of the normal vectors is first acquired in the top surface of the casing in which a size is large and a shape is clear and the collection of the normal vectors is averaged or the like and the normal vector $N_1$ is acquired.

Next, an image of the joystick 202 is specified from positional information in the top surface of the casing. Further, a collection of the normal vectors obtained over an area of the top surface of the joystick 202 is averaged or the like and the normal vector $N_0$ is acquired. Then, by monitoring the angles formed by the normal vectors, the inclination direction and the inclination angle are sequentially acquired and the information processing is performed in accordance with the inclination direction and the inclination angle.

In the information processing apparatus according to the present embodiment, among the information processing apparatus 10 according to the embodiment 1, the characteristic amount verification section 62 just has to acquire an angle between the joystick 202 and the top surface of the casing in place of the characteristic angle and provide the angle for the object information acquisition section 66. The verification of the acquired angle and the registration information can be omitted. In this case, the output data generation section 56 just has to acquire the inclination direction and the inclination angle and perform the processing based on the inclination direction and the inclination angle in the same manner as in a case in which an operation is performed against a general joystick.

According to the present embodiment described above, the normal vector is calculated from the polarized image obtained by photographing a controller having a portion in which an angle is valuable. Further, a change in the angle formed by the surfaces of the casing etc. as a reference is sequentially acquired and the change in an angle is used as input information of the information processing. A change in a relative angle of two surfaces is used. Through this process, even if the controller takes any orientation, a change in an angle of valuable portion can be correctly acquired and an operation content of the user can be specified with high accuracy.

Accordingly, even if the aspect is superficially an aspect of a general joystick, the joystick can be made to function without internally including circuits, a power supply, and the like. In the present embodiment, when an object has at least two surfaces in which an angle is variable, the processing can be performed in the same manner, and therefore a shape thereof is not limited to those of joysticks. Further, the inclination direction may be limited like a lever switch.

The present invention has been described on the basis of the embodiments. The embodiments are illustrative, and it can be recognized by those skilled in the art that various modifications are possible in regard to suitable combinations of the components and the processes of the embodiments and that also such modifications fall within the scope of the present invention.

REFERENCE SIGNS LIST

8 Object, 10 Information processing apparatus, 12 Image pickup apparatus, 16 Display apparatus, 23 CPU, 24 GPU, 26 Main memory, 50 Photographed image acquisition section, 52 Image data storage section, 54 Object recognition section, 56 Output data generation section, 60 Normal line acquisition section, 62 Characteristic amount verification section, 64 Model data storage section, 66 Object information acquisition section

INDUSTRIAL APPLICABILITY

As described above, the present invention is applicable to various information processing apparatuses such as game apparatuses, image processing apparatuses, personal computers, and controllers, and further to toys, information processing system including these apparatuses, and the like.

The invention claimed is:
1. An information processing apparatus comprising:
a normal line acquisition section configured to acquire a normal vector of each of a plurality of surfaces of an object being moved by a user from a polarized image in which the object is photographed;
an object information acquisition section configured to acquire predetermined information regarding the object on a basis of a relationship between angles of normal vectors of the plurality of surfaces included in the object, wherein the predetermined information is used to identify the object; and
an output data generation section configured to perform processing based on the predetermined information regarding the object and output a result of the processing,
wherein the user grasping and moving the object constitutes an input operation in a computer program, and
a virtual object is displayed in a virtual space generated by the computer program, wherein the virtual object replaces a photographed image of the object being moved by the user and the virtual object's position and orientation in the virtual space conforms to the normal vector obtained in each surface of the object acquired by the normal line acquisition section.
2. The information processing apparatus according to claim 1, further comprising:
a characteristic amount verification section configured to specify at least any one surface reflected on the polarized image among the plurality of surfaces by verifying, as a characteristic amount, a relationship between angles of the normal vectors with registration data,
wherein the object information acquisition section acquires information regarding the object by using information regarding the specified surface.
3. The information processing apparatus according to claim 2, wherein the characteristic amount verification section acquires, as the characteristic amount, a relationship between angles formed by normal vectors of a plurality of reference surfaces in which an angle formed by the normal vectors is a predetermined value and a normal vector of a characteristic surface that is contacted with the plurality of reference surfaces and in which angles for the plurality of reference surfaces are made different in the object, and thereby specifies the characteristic surface reflected on the polarized image.
4. The information processing apparatus according to claim 3, wherein the characteristic amount verification section acquires, as the characteristic amount, an angle formed by an average vector of the normal vectors of the plurality of reference surfaces and the normal vector of the characteristic surface contacted with the plurality of reference surfaces.
5. The information processing apparatus according to claim 3, wherein the characteristic amount verification section specifies a boundary side, as the characteristic amount, an angle formed by the normal vector of the characteristic surface in which an angle for the reference surface is different and a normal vector of one of the reference surfaces contacted with the characteristic surface in each of the contacted reference surfaces, and thereby specifies the characteristic surface.
6. The information processing apparatus according to claim 2, wherein the characteristic amount verification section further acquires a ratio of at least any one side of the plurality of surfaces and verifies the ratio with the registration data, and thereby specifies the object reflected on the polarized image.

7. The information processing apparatus according to claim 3, wherein the characteristic amount verification section acquires the normal vector of the reference surface on the basis of normal vectors of surfaces having a predetermined angle with the reference surfaces, which are provided around the reference surface.

8. The information processing apparatus according to claim 2, wherein the object information acquisition section acquires an orientation of the object on the basis of the specified surface and a normal vector thereof.

9. The information processing apparatus according to claim 2, wherein the object information acquisition section acquires a distance from an image pickup apparatus of the object on the basis of a comparison between an appearance size calculated from the specified surface and the normal vector thereof and another size of the photographed image.

10. An information processing system comprising:
an image pickup apparatus configured to photograph a polarized image of a controller comprising a joystick, wherein the image pickup device comprises at least four types of polarizers; and
an information processing apparatus configured to perform information processing according to a change in angle of the joystick determined by using the polarized image, wherein
the information processing apparatus includes:
a normal line acquisition section configured to acquire a normal vector of a top surface of the controller and a normal vector of a top surface of the joystick from the polarized image;
an object information acquisition section configured to acquire predetermined information regarding the object on a basis of a relationship between angles of the normal vectors; and
an output data generation section configured to perform processing based on the predetermined information regarding the object and output a result of the processing, wherein the normal vectors acquired and their relative angles are used to determine processing for outputting the result.

11. An operation object moved by a user is used as input information in a computer program by photographing a polarized image of the operation object, the operation object comprising:
a casing with a plurality of buttons;
a joystick;
a plurality of reference surfaces in which an angle formed by the reference surfaces is a predetermined value, wherein a first reference surface is a top surface of the casing and a second reference surface is a top surface of the joystick; and
a characteristic surface that is contacted with the plurality of reference surfaces and in which relative angles for the first and second reference surfaces are made different in the operation object in response to movement of the joystick,
wherein normal vectors of the first and second reference surfaces and their relative angles are used to determine joystick input of the operation object thereby obviating the need for a joystick circuit inside the operation object.

12. The operation object according to claim 11, wherein in the characteristic surface, an angle for the reference surface is further different in each of the contacted reference surfaces.

13. An information processing method performed by an information processing apparatus, comprising:
acquiring data of a polarized image in which an object that is grasped and being moved is photographed, from an image pickup apparatus wherein the image pickup apparatus comprises an image pickup device comprising at least four types of polarizers;
acquiring a normal vector of each of a plurality of surfaces of the moving object from the polarized image;
acquiring predetermined information regarding the object on a basis of a relationship between angles of normal vectors of the plurality of surfaces included in the object; and
performing processing based on the predetermined information regarding the moving object and outputting a result of the processing to an external apparatus,
wherein the user grasping and moving the object constitutes an input operation in a computer program, and
a virtual object is displayed in a virtual space generated by the computer program, wherein the virtual object replaces a photographed image of the object being moved by the user and the virtual object's position and orientation in the virtual space conforms to the normal vector obtained in each surface of the object acquired by the normal line acquisition section.

14. A non-transitory, computer readable storage medium containing a computer program, which when executed by a computer, causes the computer to carry out actions, comprising:
acquiring a normal vector of each of a plurality of surfaces of an object moved by a user from a polarized image in which the object is photographed;
acquiring predetermined information regarding the object on a basis of a relationship between angles of normal vectors of the plurality of surfaces included in the object; and
performing processing based on the predetermined information regarding the object and outputting a result of the processing,
wherein the user grasping and moving the object constitutes an input operation in a computer program, and
a virtual object is displayed in a virtual space generated by the computer program, wherein the virtual object replaces a photographed image of the object being moved by the user and the virtual object's position and orientation in the virtual space conforms to the normal vector obtained in each surface of the object acquired by the normal line acquisition section.

15. The information processing system according to claim 10, wherein at least some of the polarizers are adjacent to each other and the adjacent polarizers have a difference of 45 degrees.

16. The information processing system according to claim 15, wherein the image pickup device acquires four types of polarization information as two-dimensional data at the same time.

* * * * *